United States Patent
Riehl et al.

(10) Patent No.: US 11,090,881 B2
(45) Date of Patent: Aug. 17, 2021

(54) IN-SITU DESIZING FOR LIQUID INFUSION PROCESSES

(71) Applicant: UNITED TECHNOLOGIES CORPORATION, Hartford, CT (US)

(72) Inventors: John D. Riehl, Hebron, CT (US); Charles R. Watson, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 989 days.

(21) Appl. No.: 15/027,800

(22) PCT Filed: Oct. 20, 2014

(86) PCT No.: PCT/US2014/061324
§ 371 (c)(1),
(2) Date: Apr. 7, 2016

(87) PCT Pub. No.: WO2015/069442
PCT Pub. Date: May 14, 2015

(65) Prior Publication Data
US 2016/0243772 A1    Aug. 25, 2016

Related U.S. Application Data

(60) Provisional application No. 61/900,430, filed on Nov. 6, 2013.

(51) Int. Cl.
*B29C 70/48* (2006.01)
*B29B 13/02* (2006.01)
(Continued)

(52) U.S. Cl.
CPC ............. *B29C 70/48* (2013.01); *B29B 13/00* (2013.01); *B29B 13/023* (2013.01); *B29C 33/10* (2013.01);
(Continued)

(58) Field of Classification Search
CPC ................................ B29C 70/48; B29B 13/00
See application file for complete search history.

(56) References Cited

U.S. PATENT DOCUMENTS 2,970,934 A * 2/1961 May .................. C03C 25/002
134/2
3,207,640 A   9/1965 Walker
(Continued)

FOREIGN PATENT DOCUMENTS

EP     1647537 A1    4/2006
JP     2006168165 A  6/2006
(Continued)

OTHER PUBLICATIONS

Naganuma, Tamaki, et al. "Influence of prepreg conditions on the void occurrence and tensile properties of woven glass fiber-reinforced polyimide composites." Composites Science and Technology 69.14 (2009): 2428-2433. (Year: 2009).*

(Continued)

*Primary Examiner* — Leith S Shafi
*Assistant Examiner* — Nicholas R Krasnow
(74) *Attorney, Agent, or Firm* — Carlson, Gaskey & Olds, P.C.

(57) ABSTRACT

A method of molding a component includes the steps of providing a plurality of fibers, applying the fibers with a low temperature sizing to form a plurality of sized fibers, forming a preform from the plurality of sized fibers, placing the preform in a mold, and de-sizing the preform by heating the mold to an initial temperature that is sufficient to break down the low temperature sizing to a gaseous phase. A molding apparatus is also disclosed.

18 Claims, 1 Drawing Sheet

(51) Int. Cl.
*B29B 13/00* (2006.01)
*B29C 33/10* (2006.01)
*B29K 79/00* (2006.01)
*B29L 9/00* (2006.01)

(52) U.S. Cl.
CPC ... *B29B 2013/002* (2013.01); *B29B 2013/005* (2013.01); *B29K 2079/08* (2013.01); *B29L 2009/00* (2013.01)

(56) References Cited

U.S. PATENT DOCUMENTS

| | | | |
|---|---|---|---|
| 5,306,448 | A | 4/1994 | Kromrey |
| 5,393,215 | A | 2/1995 | Donovan, Sr. |
| 5,516,271 | A | 5/1996 | Swenor et al. |
| 5,518,385 | A | 5/1996 | Graff |
| 5,518,388 | A | 5/1996 | Swenor et al. |
| 5,670,256 | A * | 9/1997 | St. Clair ............ C08G 73/1014 428/364 |
| 6,036,900 | A | 3/2000 | Munk et al. |
| 6,217,283 | B1 | 4/2001 | Ravenhall et al. |
| 8,030,433 | B2 | 10/2011 | Whiteker et al. |
| 8,030,437 | B2 | 10/2011 | Whiteker et al. |
| 8,318,067 | B2 | 11/2012 | Northfield et al. |
| 2006/0081323 | A1* | 4/2006 | Millard ................ B32B 18/00 156/89.11 |
| 2012/0231107 | A1* | 9/2012 | Waldrop ............... B29C 70/443 425/388 |
| 2012/0280430 | A1 | 11/2012 | Jones |
| 2013/0130583 | A1* | 5/2013 | Bjornhov ................ B29C 70/48 442/218 |

FOREIGN PATENT DOCUMENTS

| | | | |
|---|---|---|---|
| JP | 2007191662 | A * | 8/2007 |
| JP | 2008302498 | A | 12/2008 |
| WO | 98030374 | A1 | 7/1998 |

OTHER PUBLICATIONS

Chollon—Chollon, G., Pailler, R., Naslain, R., Laanani, F., Monthioux, M. and Olry, P., 1997. Thermal stability of a PCS-derived SiC fibre with a low oxygen content (Hi-Nicalon). Journal of materials science, 32(2), pp. 327-347. <https://link.springer.com/content/pdf/10.1023%2FA%3A1018541030308.pdf> (Year: 1997).*
Gouadec—Gouadec, G., Karlin, S. and Colomban, P., 1998. Raman extensometrystudy of NLM202® and Hi-Nicalon® SiC fibres. Composites Part B: Engineering, 29(3), pp. 251-261, <https://doi.org/10.1016/S1359-8368(97)00027-9> (Year: 1998).*
International Preliminary Report on Patentability for International Application No. PCT/US2014/061324 dated May 19, 2016.
International Search Report from corresponding PCT/US14/61324.
Supplementary European Search Report for European Application No. 14860577.7 dated Jun. 6, 2017.

* cited by examiner

IN-SITU DESIZING FOR LIQUID INFUSION PROCESSES

CROSS-REFERENCE TO RELATED APPLICATION

This application claims priority to U.S. Provisional Application No. 61/900,430, filed Nov. 6, 2013.

BACKGROUND OF THE INVENTION

Liquid molding processes such as RTM (Resin Transfer Molding), VaRTM (Vacuum Assisted Resin Transfer Molding), or RFI (Resin Film Infusion) involve the infusion of a liquid resin through a "dry" fiber preform. The dry fiber preform is comprised of a plurality of fibers that are woven together to form a desired shape. The infusion of liquid resin can be accomplished via positive pressure, vacuum pressure, or both.

Sizings are typically applied to fibers to reduce fiber damage during weaving operations. Sizings improve the abrasion resistance of fibers and decrease their tendency to "fuzz" during weaving. There are many different types of sizings, and sizings are typically applied to all the fibers that are subjected to a weaving process. Sizings should remain stable, and not degrade or outgas, during both processing (heat, pressure) and during long-term exposure at elevated application temperatures. Sizings that degrade during processing or application can have detrimental effects on composite quality including porosity formation, delamination, and weakened fiber/matrix interfaces.

High temperature organic matrix composites (OMC), such as polyimide-matrix composites for example, present unique challenges for fiber sizings due to both their high processing temperatures and high application temperatures. The feedstock for polyimide-matrix OMCs is most commonly available in a pre-impregnated form and commonly utilizes high temperature polyimide sizings on the fiber. Polyimide-based sizings are expensive and are typically not readily available due to their low demand and volumes.

SUMMARY OF THE INVENTION

In a featured embodiment, a method of molding a component includes the steps of providing a plurality of fibers, applying the fibers with a low temperature sizing to form a plurality of sized fibers, forming a preform from the plurality of sized fibers, placing the preform in a mold, and de-sizing the preform by heating the mold to an initial temperature that is sufficient to break down the low temperature sizing to a gaseous phase.

In another embodiment according to the previous embodiment, the plurality of fibers are high temperature fibers formed from a material that is capable of being processed at a temperature that is 600 degrees Fahrenheit or greater.

In another embodiment according to any of the previous embodiments, the plurality of fibers are comprised of a polyimide-matrix composite material.

In another embodiment according to any of the previous embodiments, the low temperature sizing is comprised of a material capable of complete decomposition at temperatures less than 850 degrees Fahrenheit.

In another embodiment according to any of the previous embodiments, the gaseous phase of the low temperature sizing is removed from the mold via at least one of a vacuum pressure and a positive pressure.

In another embodiment according to any of the previous embodiments, the mold is heated to an infusion temperature and an infusion liquid is injected to completely infuse the preform with the infusion liquid.

In another embodiment according to any of the previous embodiments, the mold is heated to a curing temperature for a predetermined period of time to provide a cured preform.

In another embodiment according to any of the previous embodiments, the preform is comprised of a non-pre-impregnated material.

In another embodiment according to any of the previous embodiments, the preform comprises a three-dimensional dry-shaped preform.

In another embodiment according to any of the previous embodiments, the dry-shaped preform is formed by at least one of braiding and weaving.

In another embodiment according to any of the previous embodiments, the preform comprises a two-dimensional stack of tackified fabric.

In another featured embodiment, a method of molding a component includes the steps of providing a plurality of fibers and applying the fibers with a low temperature sizing to form a plurality of sized fibers. A preform is formed from the plurality of sized fibers. The preform is placed in a mold and de-sizing by heating the mold to an initial temperature that is sufficient to break down the low temperature sizing to a gaseous phase. The gaseous phase of the low temperature sizing is removed from the mold. The mold is heated to an infusion temperature and an infusion liquid is injected to infuse the preform. The mold is heated to a curing temperature to form a cured polyimide-matrix composite material.

In another embodiment according to the previous embodiment, heating the mold to an infusion temperature and injecting an infusion liquid to infuse the preform is performed subsequent to removing the gaseous phase of the low temperature sizing from the mold.

In another embodiment according to any of the previous embodiments, the low temperature sizing is comprised of a material capable of complete decomposition at temperatures less than 850 degrees Fahrenheit.

In another embodiment according to any of the previous embodiments, the infusion liquid is resin.

In another embodiment according to any of the previous embodiments, the gaseous phase of the low temperature sizing is removed from the mold with a vacuum pump.

In another featured embodiment, a molding apparatus includes a mold defining an internal cavity. A shaped reinforcement is configured to be positioned within the internal cavity. The shaped reinforcement is comprised of a plurality of fibers sized with a low temperature sizing. A heat source is configured to heat the mold. The preform is de-sized by the heat source heating the mold to an initial temperature that is sufficient to break down the low temperature sizing to a gaseous phase. A vacuum pump is configured to remove the gaseous phase of the low temperature sizing material or a pressurized gas flow designed to remove the gaseous phase of the low temperature sizing material. An injector is configured to inject an infusion liquid to infuse a de-sized shaped reinforcement. The heat source heats the mold to an infusion temperature such that the infusion liquid completely wets-out the fibers to provide an infused shaped reinforcement. The heat source heats the infused shaped reinforcement to a curing temperature.

In another embodiment according to the previous embodiment, the plurality of fibers are high temperature fibers. The low temperature sizing is comprised of a material capable of complete decomposition at temperatures less than 850 degrees Fahrenheit.

In another embodiment according to any of the previous embodiments, the infusion liquid is resin.

In another embodiment according to any of the previous embodiments, the preform is comprised of a non-pre-impregnated material.

The foregoing features and elements may be combined in any combination without exclusivity, unless expressly indicated otherwise.

These and other features may be best understood from the following drawings and specification.

DETAILED DESCRIPTION

Figure 1:
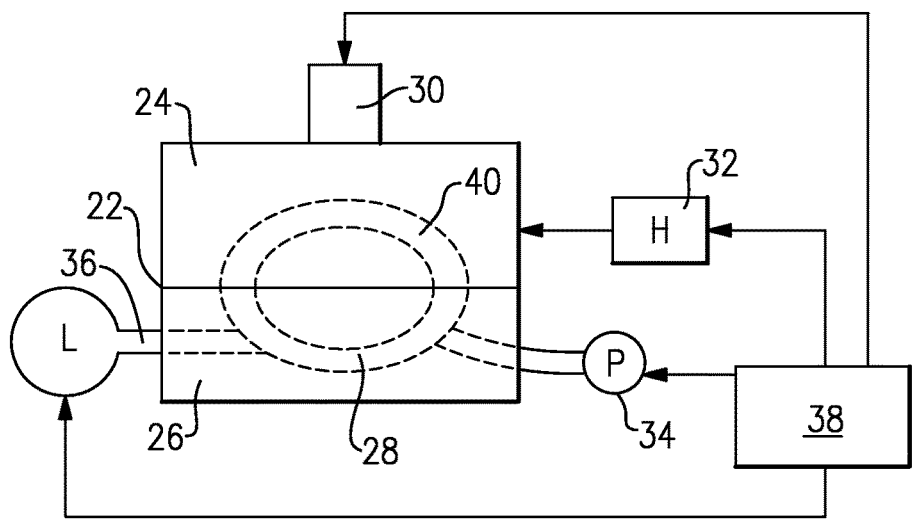
FIG. 1 is a schematic representation of a molding apparatus that incorporates the subject invention.

FIG. 1 schematically illustrates a molding apparatus 20. The apparatus 20 comprises an apparatus for liquid molding processes such as RTM (Resin Transfer Molding). VaRTM (Vacuum Assisted Resin Transfer Molding) or RFI (Resin Film Infusion) are other examples of liquid infusion processes with applicability to this invention These processes involve the infusion of a liquid resin through a "dry" fiber preform. The dry fiber preform is comprised of a plurality of fibers that are woven, braided, or joined together using any of the industry established textile joining techniques to form a desired shape. The infusion of liquid can be accomplished via positive pressure, vacuum pressure, or both.

As shown in FIG. 1, the molding apparatus 20 includes a mold 22 having at least an upper mold 24 and a lower mold 26 that cooperate to define an internal cavity 28. When closed. A press 30 can be used to apply pressure to the mold 22, alternatively the mold can be closed via any mechanical methods (i.e. bolts). The apparatus 20 may also include a heat source 32 to heat the mold, a vacuum pump 34, and an injector 36 that injects the infusion liquid into the internal cavity 28. A controller 38 controls operation of the press 30, heat source 32, vacuum pump 34, and injector 36.

In order to form a component with a desired shape, a shaped reinforcement 40 is formed and placed into the internal cavity 28. The shaped reinforcement 40 is placed into the mold 22 for the subsequent infusion and cure of the liquid resin. In one example, the reinforcement 40 is a three dimensional (3D) "dry", shaped preform, such as one produced by braiding or 3D weaving. In another example, the reinforcement 40 is a two dimensional (2D) stack of "tackified" fabric that forms a "tackified" reinforcement. This "tackified" reinforcement could be a collection of fibers in a woven form, such as a Satin weave or other construction. Fabrics are "tackified" to overcome the difficulties of cutting, handling, stacking, shaping and arranging "dry" fabric. Tackifiers are typically applied to the surfaces of fabrics, as opposed to impregnated, and are either lightly applied coatings of a targeted matrix material, or lightly applied coatings of any binder material compatible with the targeted matrix material. Whether the fabric stack is a shape woven preform, or a shaped stack of 2D fabric, the reinforcement 40 is placed in the mold 22 that is configured to produce a targeted molded component shape.

In one example, the mold 22 comprises a metal mold that is capable of maintaining vacuum and withstanding a targeted cure temperature and infusion pressure. This is particularly applicable to a RTM process; however, other mold configurations for other processes could also be used.

The shaped reinforcement 40 comprises a preform that is formed from a plurality of fibers that are sized with a sizing material. Sizings are typically applied to the "dry" fibers to reduce fiber damage during weaving operations. Sizings improve the abrasion resistance of fibers and decrease their tendency to "fuzz" during weaving. Many different sizings are utilized within industry and sizings are applied to all the common aerospace fibers including carbon, ceramic, glass, aramid and nylon fibers.

Common sizing chemistries for low temperature applications include, but are not limited to, PVA (polyvinyl alcohol), silicones, and epoxies. The sizing chemistry for a particular fiber is generally selected by considering the compatibility of the sizing with both the fiber and the targeted infusion liquid, in addition to considering the processing and application environment. Sizings should remain stable, and not degrade or outgas, during both processing (heat, pressure) and during long-term exposure at elevated application temperatures. Sizings that degrade during processing or application can have significant detrimental effects on composite part quality including porosity formation, delamination and weakened fiber/matrix interfaces.

In one example, the molding apparatus 20 is used to mold a component that will be subjected to high stress levels and high operational temperatures. The shaped reinforcement 40 used to form this component is comprised of a plurality of fibers. High temperature organic matrix composites present unique challenges for fiber sizings due to both their high processing temperatures and high application temperatures. One example family of high temperature organic matrix composites comprises the polyimide-matrix composites, which are typically processed at temperatures of 600 degrees Fahrenheit (315 degrees Celsius) or above, and are targeted for long-term operation, greater than 2000 hours for example, in air environments of 500 degrees Fahrenheit (260 degrees Celsius) and above.

The feedstock for these high temperature organic matrix composites is most commonly available in a pre-impregnated form and utilizes high temperature polyimide sizings on the fiber. These specialized sizings are disadvantageous due to their high cost and low availability due to their low demand. Further, these sizings may deteriorate during processing and application and degrade part quality.

The subject invention utilizes shaped reinforcements 40 for polyimide-matrix composites that are not pre-impregnated. These non-pre-impregnated reinforcements 40 are used in the subject liquid molding applications discussed above, or in any of the industry derivatives of these composite fabrication methods. Further, these polyimide-matrix composites are comprised of fibers that are not sized with the traditional high temperature polyimide sizings but are sized with more common, lower temperature capable sizings such as epoxy and PVA that operate comfortably in the processing and application temperature environment of epoxy and BMI composites generally considered to be less than 450 degrees Fahrenheit. Low temperature sizings are comprised of materials that are capable of being processed at temperatures up to 450 degrees Fahrenheit.

Figure 2:
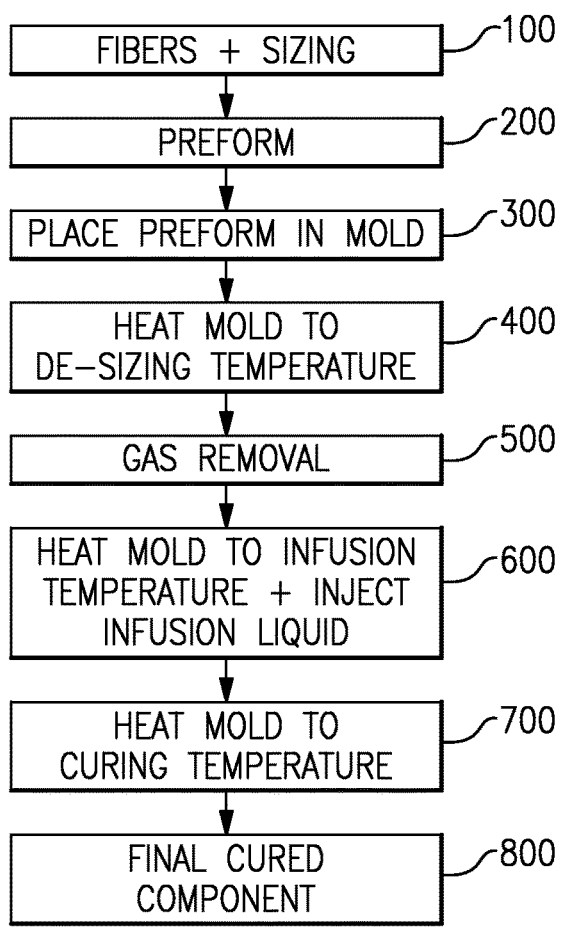
FIG. 2 describes one example method of molding a component with the molding apparatus of FIG. 1.

As shown in FIG. 2, the method of molding the component includes the steps as described below. A plurality fibers are sized with a low temperature sizing to form a plurality of sized fibers as indicated at 100. The shaped reinforcement 40, i.e. the preform, is formed from the plurality of sized fibers as indicated at 200. The preform is placed in the mold 22 as indicated at 300. Next, the preform is de-sized by using the heat source 30 to heat the mold 22 to an initial temperature that is sufficient to break down the low temperature sizing to a gaseous phase as indicated at 400. Next, any gas generated during the de-sizing step is then removed from the mold 22 via the vacuum pump 34, or via any alternative means that would accomplish evacuation of the decomposed sizing such as the positive flow of an inert gas as indicated at 500. It should be noted that the desizing temperature and duration prescribed should be sufficient enough to remove the low temperature sizing in its entirety but low enough as to not damage the parent fiber. In one example, the low temperature sizing is comprised of a material capable of complete decomposition at temperatures less than 850 degrees Fahrenheit.

By initially heating the mold 22 to an appropriate de-sizing temperature prior to infusion, it allows for the use of lower cost and more readily available, lower-temperature capable sizings such as epoxies, PVA, silicone, etc. The 3D or 2D preforms, while integrated within a mold assembly and subjected to an active vacuum, are elevated to a temperature at which the organic sizing would break down to a gaseous phase. The generated gas is then removed from the preform and mold by an active vacuum or positive pressure of a cleansing gaseous phase. The mold 22 is taken to this temperature and held there for sufficient time until the de-sizing process is complete. This temperature could be above or below a targeted infusion temperature as long as the mold assembly is stable at this temperature.

Once the sizing is decomposed and removed, the mold 22 is heated up to an infusion temperature and the infusion liquid is injected into the mold 22 with the injector 36 as indicated at 600. The mold 22 should be stabilized at the infusion temperature prior to injection. The infusion temperature is one that produces favorable viscosity properties for the infusion liquid while striking a balance with working life (the amount of time the infusion liquid is useful at this viscosity prior to the onset of cure). Once the preform is completely saturated with the infusing liquid, i.e. there is a compete wet-out of all the fibers in the mold 22, the heat source 32 heats the mold 22 to a curing temperature as indicated at step 700, and maintains that temperature for a specified amount of time for curing to occur as indicated at step 800.

It should be understood that the operation of the various components of the molding apparatus 20, e.g. heat source 32, pump 34, press 30, injector 36, etc., is controlled by the controller 38. The controller 38 is appropriately configured and programmed as known in the art to perform the necessary steps of the subject method.

By using the subject method and apparatus, process lead and cycle times are significantly reduced when compared to traditional molding processes. Further, due to the use of the lower cost, commonly available sizings, it is easier to obtain material and the process cost for the component is also significantly reduced. Further, there is improved component quality as the possibility of deterioration of the sizing during operation is eliminated.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A method of molding a component comprising the steps of:
  (a) providing a plurality of fibers;
  (b) applying the fibers with a low temperature sizing to form a plurality of sized fibers;
  (c) forming a preform from the plurality of sized fibers;
  (d) placing the preform in a mold; and
  (e) de-sizing the preform by heating the mold to an initial temperature that is sufficient to break down the low temperature sizing to a gaseous phase.

2. The method according to claim 1, wherein the plurality of fibers are high temperature fibers formed from a material that is capable of being processed at a temperature that is 600 degrees Fahrenheit or greater.

3. The method according to claim 2, wherein the plurality of fibers are comprised of a polyimide-matrix composite material.

4. The method according to claim 2, wherein the low temperature sizing is comprised of a material capable of complete decomposition at temperatures less than 850 degrees Fahrenheit.

5. The method according to claim 1, including (f) removing the gaseous phase of the low temperature sizing from the mold via at least one of a vacuum pressure and a positive pressure.

6. The method according to claim 5, including (g) heating the mold to an infusion temperature and injecting an infusion liquid to completely infuse the preform with the infusion liquid.

7. The method according to claim 6, including (h) heating the mold to a curing temperature for a predetermined period of time to provide a cured preform.

8. The method according to claim 1, wherein the preform is comprised of a non-pre-impregnated material.

9. The method according to claim 1, wherein the preform comprises a three-dimensional dry-shaped preform.

10. The method according to claim 9, wherein the dry-shaped preform is formed by at least one of braiding and weaving.

11. The method according to claim 1, wherein the preform comprises a stack of tackified fabric.

12. A method of molding a component comprising the steps of:
  (a) providing a plurality of fibers;
  (b) applying the fibers with a low temperature sizing to form a plurality of sized fibers;
  (c) forming a preform from the plurality of sized fibers;
  (d) placing the preform in a mold;
  (e) de-sizing the preform by heating the mold to an initial temperature that is sufficient to break down the low temperature sizing to a gaseous phase;
  (f) removing the gaseous phase of the low temperature sizing from the mold;
  (g) heating the mold to an infusion temperature and injecting an infusion liquid to infuse the preform; and
  (h) heating the mold to a curing temperature to form a cured polyimide-matrix composite material.

13. The method according to claim 12, wherein step (g) is performed subsequent to step (f).

14. The method according to claim 12, wherein the low temperature sizing is comprised of a material capable of complete decomposition at temperatures less than 850 degrees Fahrenheit.

15. The method according to claim 14, wherein the infusion liquid is resin.

16. The method according to claim 14, wherein step (f) includes removing the gaseous phase with a vacuum pump.

17. The method according to claim 14, wherein the plurality of fibers are high temperature fibers formed from a material that is capable of being processed at a temperature that is 600 degrees Fahrenheit or greater.

18. The method according to claim 17, wherein the plurality of fibers are comprised of a polyimide-matrix composite material.

\* \* \* \* \*